Feb. 11, 1969  R. J. BARBER  3,426,978
REELS
Filed Aug. 7, 1967

INVENTOR
Ronald Jesse Barber

BY: Morris & Bateman
ATTYS

United States Patent Office 3,426,978
Patented Feb. 11, 1969

3,426,978
REELS
Ronald Jesse Barber, 62 Grange Road,
Erdington, Birmingham 24, England
Filed Aug. 7, 1967, Ser. No. 658,912
Claims priority, application Great Britain, Aug. 12, 1966,
36,159/66
U.S. Cl. 242—74
Int. Cl. B65h 75/28
12 Claims

ABSTRACT OF THE DISCLOSURE

A reel carrying one slide-operated fastener part to enable the reel to be releasably attached to a complementary slide-operated fastener part carried at at least one end of a liner. This positions the liner with respect to the reel to prevent telescoping of the liner when the latter is wound onto the reel, especially when carrying uncured rubber.

---

This invention relates to reels of the kind particularly, but not exclusively, used for boxing or batching self-adhesive substances such as uncured rubbers and certain plastics, onto liners so that layers of the self-adhesive substance are interleaved with a lining which does not adhere to the substance on at least one side, when the substance is spirally wound onto a reel.

It is essential to prevent telescoping of a liner as the latter is wound onto a boxing or batching reel i.e. with the liner edges not superimposed so that the liner roll increases in width during winding, since with large lengths of liner the latter may eventually be wound beyond one end and completely off the reel or may foul any reel flanges. Even with much less marked telescoping, during future processing of the substance which has been interleaved with the liner, the substance may be caused to be misaligned with the processing apparatus.

To overcome the above difficulty, "captive lining" devices have been devised, comprising a pair of reels carried in a magazine and having a respective end of a liner anchored to the periphery of each reel. However, such a device has the disadvantages that the magazines are unwieldy and expensive to manufacture.

Objects of the present invention are to provide a reel having a particularly simple and inexpensive means for detachably anchoring a liner to the reel so that the liner can be wound onto the reel without telescoping of the liner.

In accordance with this invention, a reel carries a first slide-operated fastener part capable of engagement with a second complementary slide-operated fastener part carried at one end of a liner to be wound onto the reel so that the liner is detachably anchored to the reel.

The invention also resides in a liner for detachable anchorage to a reel as defined above, comprising a longitudinal strip of a flexible material having a pair of slide-operated fastener parts provided at respective ends of the strip and extending transversely of the strip.

From a further aspect, the invention resides in a reel and liner unit wherein the liner carries at each end a slide-operated fastener part detachably engageable with a complementary slide-operated fastener part carried by the reel.

A preferred embodiment of the invention is now more particularly described in relation to an uncured rubber or plastic processing apparatus and with reference to the accompanying drawings, wherein.

Figure 1:
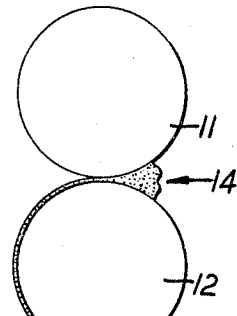
FIGURE 1 is a schematic side elevation of the processing apparatus.
Figure 1:
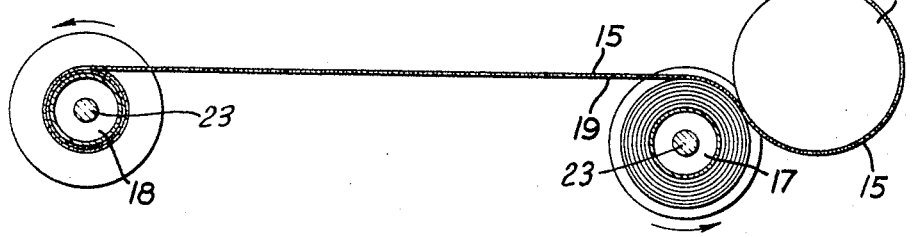

Referring initially to FIGURE 1, the processing apparatus includes first, second and third rotatable calender rollers 11, 12, 13 respectively, which co-act to produce an even web 15 of an uncured rubber or plastic fed into the apparatus at 14. The apparatus also includes a feed reel axes. The reel 17 carries a liner 19 in a roll with the axes. The feed reel carries a liner 19 in a roll with the inner end of the liner detachably anchored to the reel 17 and the outer end of the liner is detachably anchored to the batching reel so that rotation causes the liner to be taken up on the batching reel from the feed reel. As the web 15 is taken up on the batching reel 18, its layers are interleaved by the liner 19. Thus the roll consisting of the batching reel 18, liner 19 and web 15 can be stored conveniently after the liner has been detached from the feed reel 17, with the liner preventing adhesion between the separate layers of the web 15 during storage and subsequent processing of the web.

During subsequent processing, the batching reel will be used as a feed reel to feed the web 15, whilst on its liner, through a process station and onto another batching reel.

The liner may be marked to indicate during unwinding of the liner from a feed reel, when complete unwinding has almost occurred, that rotation of the batching reel should be halted to prevent damage to the liner or to the means detachably anchoring the liner to the feed reel.

Figure 2:
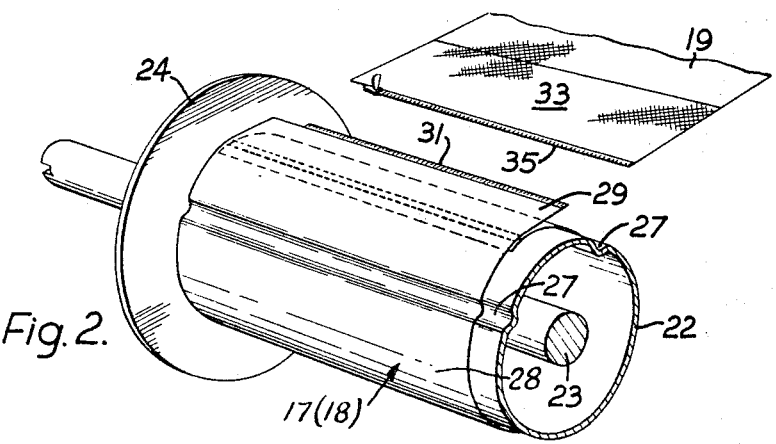
FIGURE 2 is a part-sectional perspective view of a reel used in the apparatus of FIGURE 1
Figure 3:
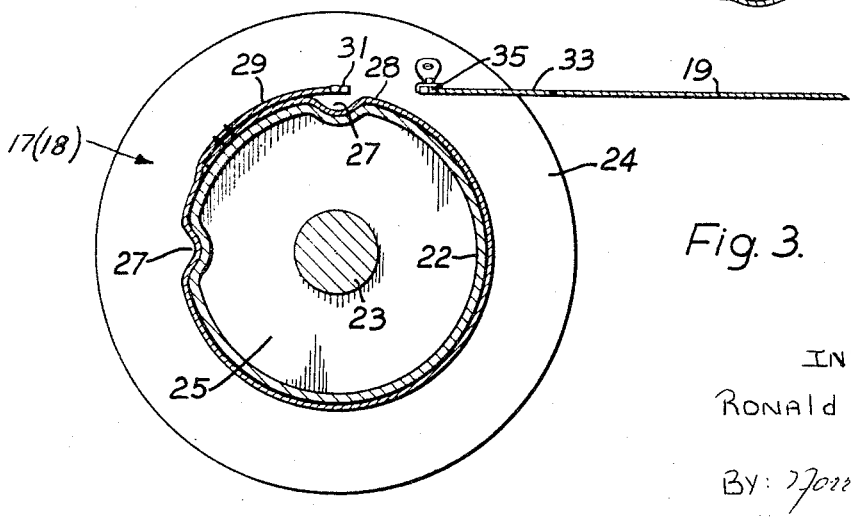
FIGURE 3 is an enlarged sectional side elevation of the reel shown in FIGURE 2.

As shown in FIGURES 2 and 3, each reel comprises a drum 22 co-axially mounted about a shaft 23 by a pair of plugs 25 welded in respective ends of the drum 22. The drum is provided with a flange at each end, defined by a disc 24 mounted co-axially on the shaft 23. The drum periphery has formed therein a pair of arcuately spaced axially parallel grooves 27.

An attachment length 28 of woven cloth, for example linen, is adhered around the drum with its end parts stitched to one another to define a sleeve and with one end part overlapping the other end part. The overlapping end part defines an attachment strip 29 which is hinged to the roller along the stitched line, and the arrangement is such that the stitched line is parallel to and mid-way between the grooves 27.

A first complementary part 31 of a slide-operated fastener of the kind known as a "zip-fastener," preferably made of nylon, is stitched along the width of the strip 29 at the end of the latter unattached to the reel, so that, when the strip 29 is under tension, the first complementary fastener part 31 is parallel to the grooves 27 and the reel axis of rotation. The arrangement is such that with a face of the strip 29 lying wholly in contact with the reel periphery, the first fastener part 31 is received in a respective one of the grooves 27.

The liner 19 as shown in the drawings consists of a length of flexible textile material, but may be, alternatively, made of plastic such as polyethylene. A second complementary zip-fastener part 35 is stitched along the width of a strip of textile material 33 at one edge of the strip and the latter, in turn is stitched at its opposite edge to one end of the liner 19. Where the liner is made of plastic, the strip 33 is adhered to the liner. The zip-fastener lies perpendicular to the longitudinal edges of the liner when the latter and the strip 33 are under tension. The zip-fastener does not extend beyond the longitudinal edges of the webbing so as to ensure that the fastener cannot foul any apparatus during use of the liner. Respective second complementary zip-fastener parts are attached to both ends of the liner.

In use, the liner 19 is detachably anchored at respective ends to the reels 18 by interengagement of the complementary zip-fastener parts 31, 35. When the liner is under tension its longitudinal edges are normal to the axes of the reels and the liner can be wound, therefore, onto the batching reel 18 without telescoping of the liner occurring. During winding of the liner onto the batching reel, the interengaged zip-fastener parts 31, 35 are received in one of the grooves so that no projection of the fastener occurs radially outwardly of the drum periphery. Uneven winding of the liner onto the reel is thereby prevented. The particular groove in which the fastener is received is dependent on the direction of rotation of the reel during winding.

To enable any one of a plurality of liners to be attached to each reel, all the liners are provided with identical second complementary fastener parts 35. Zip-fasteners are made in standard sizes and weights, with one complementary part of each fastener being interchangeable with the equivalent part of another fastener of the same size and weight, so that identical fastener parts can be obtained without difficulty.

The invention can also be applied to "captive lining" magazines which normally mount both feed and batching rollers with a liner permanently attached thereto, the whole magazine being transported from one process apparatus to another. By attaching the liner to the reels by slide-operated fasteners, the liner can readily be removed, for example for cleaning.

If a reel is to be used for rotation in only one direction, only one groove need be provided in the reel periphery and in some applications of the invention, radial outward projection of the fastener from the reel periphery may not be disadvantageous, so that no grooves need be provided.

I claim:

1. A reel carrying a first slide-operated fastener part capable of engagement with a second complementary slide-operated fastener part carried at one end of a liner to be wound onto the reel so that the liner is detachably anchored to the reel.

2. A reel according to claim 1, wherein the first slide-operated fastener part is a zip fastener part.

3. A reel according to claim 1, wherein the first slide-operated fastener part is attached to a flexible attachment strip which in turn is attached to the reel.

4. A reel according to claim 1, having in its periphery a groove capable of receiving the interengaged first and second slide-operated fastener parts.

5. A reel according to claim 4, wherein the attachment strip hinges the first slide-operated fastener part to the reel so that the first part is movable into or out of the reel groove.

6. A reel according to claim 5, having a pair of arcuately spaced grooves each equi-spaced with respect to the position of hinging of the attachment strip to the reel, so that the first slide-operated fastener part can be received alternatively in the two grooves.

7. A reel according to claim 6, wherein the two grooves are parallel to the reel axis of rotation.

8. A reel according to claim 1, including a pair of flanges provided at respective ends of the reel.

9. A liner for detachable anchorage to a reel according to claim 1, comprising a longitudinal strip of a flexible material having a pair of slide-operated fastener parts provided at respective ends of the strip and extending transversely of the strip.

10. A liner according to claim 9, wherein each slide-operated fastener part is attached to an attachment strip which in turn is attached to the longitudinal strip of flexible material.

11. A liner according to claim 9, wherein each slide-operated fastener part is operatively positioned extending perpendicular to the longitudinal edges of the flexible strip.

12. A reel and liner unit comprising a liner having a slide-operated fastener part at each end and a pair of reels carrying cooperating slide-operated slide-fastener parts to which the liner ends are adapted to be detachably secured.

References Cited

UNITED STATES PATENTS

| | | | |
|---|---|---|---|
| 2,009,896 | 7/1935 | Meyer | 242—74 X |
| 2,539,676 | 1/1951 | Sontag et al. | 242—74 X |

NATHAN L. MINTZ, *Primary Examiner.*